Feb. 18, 1964   J. A. ANDERSON   3,121,550
WINDOW SHADE BRACKET WITH CRIMPED NAIL
Filed April 15, 1960
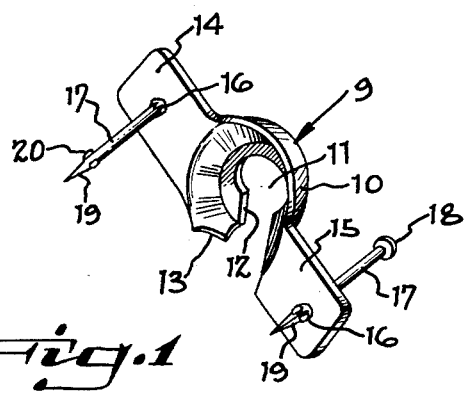
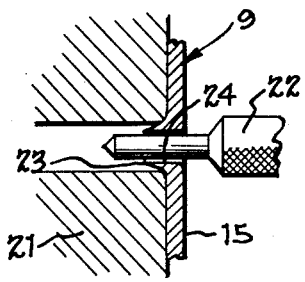
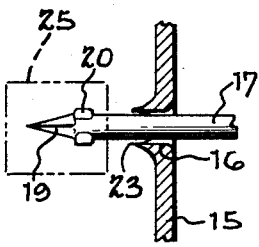
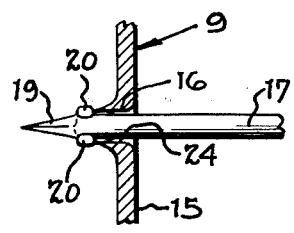
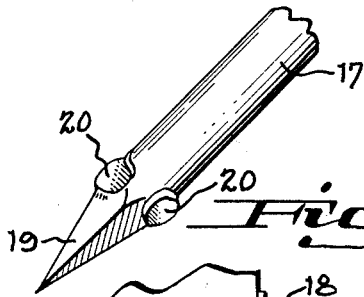
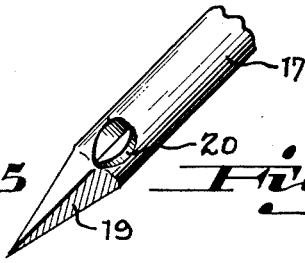
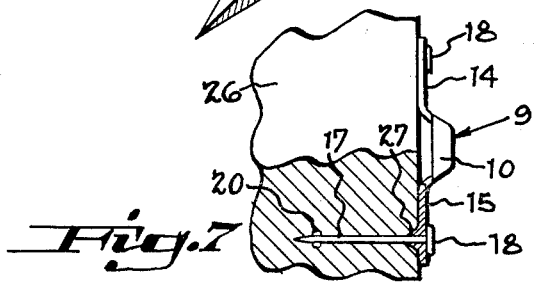
INVENTOR.
James A. Anderson.
BY
Wood, Herron & Evans,
ATTORNEYS.

United States Patent Office 3,121,550
Patented Feb. 18, 1964

3,121,550
WINDOW SHADE BRACKET WITH CRIMPED NAIL
James A. Anderson, Muskegon, Mich., assignor to Breneman-Hartshorn, Inc., Cincinnati, Ohio, a corporation of Ohio
Filed Apr. 15, 1960, Ser. No. 22,567
4 Claims. (Cl. 248—216)

This invention relates to a bracket and nail combination and to the method of manufacturing a bracket and nail combination.

The invention will be described in relation to a particular type of bracket adapted to secure a window shade roller in a frame, but it is to be understood that the invention is applicable to other types of window shade brackets and to brackets having other uses.

There have been prior attempts to manufacture brackets with the securing nails or screws being fixed in some manner to the bracket. Such a combination is obviously a desirable concept for in the exact positioning and securing a bracket to supporting structure it is at best awkward to hold a bracket in a precise position, to hold a nail in position with respect to the bracket and to hammer the nail. By combining the bracket and nail, the single unit can more conveniently be positioned and held in the desired position during the hammering process.

The prior attempts to combine a nail and bracket into a single unit have involved securely fixing the nail to the unit, for example, as by soldering. The unit having the nail securely fixed thereto presents several disadvantages. The points and almost the whole shank of the nail must project from the bracket and thus render somewhat difficult the locating of the bracket in the proper position on its ultimate supporting structure. When positioned, it is many times necessary to pound on the bracket itself in order to drive the nail into the supporting structure. Such a process can result in damaging or at least marring the bracket. Similarly, the removal of the nail must be effected by pulling on the bracket itself, with the consequent possibility of damage. Further, the fixed nail design is not particularly suitable for a bracket requiring more than one nail, principally because of the difficulty in simultaneously driving two or more nails into a supporting structure.

The present invention provides a bracket and nail assembly which eliminates the several disadvantages of prior practices. The invention in part comprises a bracket having at least one nail which is secured against inadvertent removal from the bracket, and which is axially slidable with respect to the bracket.

The slidability of the nail with respect to the bracket is ideally suited for brackets requiring more than one nail, for each nail can be independently driven into the supporting structure while the bracket itself is held in its proper position adjacent the supporting structure.

An objective of the invention has been to provide a method of mounting the nail in a position substantially perpendicular to the plane of a metal portion and to provide a novel product resulting from the method. The method comprises punching a nail hole in the metal with an instrument which will, while forming the hole, strike from the metal an annular flange surrounding the hole. The metal must be deformable and preferably have the characteristics of sheet steel. The annular flange combined with the thickness of the sheet metal provides a bore for slidably receiving a nail and the bore having a sufficient axial dimension to hold the nail in a position substantially perpendicular to the plane of the sheet metal.

The nail, after being inserted in the hole formed as described above, is crimped adjacent its pointed end to form laterally projecting ears which will block the inadvertent removal of the nail from the bracket. In addition to maintaining the perpendicularity of the nail with respect to the sheet metal, the annular flange, which projects a distance slightly greater than the thickness of the sheet metal, will be driven into the supporting structure and will assist in securing the bracket to the supporting structure.

Brackets which are secured to window frames to hold window shade rollers are continually subjected to lateral stresses from the pulling on the shade and to vibrational stresses imparted by the window shade reeling mechanism. Under such repeated stresses nails tend to become loosened and the brackets rattle during the raising and lowering of the shade. The annular flange of the invention tends to eliminate such undesirable loosening and rattling, or at least to delay for a considerable period the time at which the window shade bracket will become loose.

The annular flange created by the forming of the hole in the bracket will, during the mounting of the bracket, be driven into the wood of the window frame. The annular flanges, by being driven into the wood, will directly resist any stress applied laterally to the window shade which tends to loosen or remove the bracket. With this combination the nails, rather than having to resist both axial and lateral forces, will function principally to resist axially directed forces.

It has been an objective of the invention to provide a bracket and nail unit in which the nails, while being slidable in the bracket, are laterally stabilized in a position perpendicular to the sheet metal of the bracket in which they are mounted.

It has been another objective of the invention to provide a bracket and nail unit in which the nails are secured against inadvertent removal, while at the same time being axially slidable, thus permitting two or more nails on a single bracket to be driven independently of each other and independently of the bracket. The nails also can be pulled from the supporting structure into which they have been driven without requiring pulling on the bracket.

These and other objectives of the invention will become more readily apparent from the following detailed description taken in conjunction with the accompanying drawings in which:

FIG. 1 is a perspective view of a bracket and nail assembly in accordance with the invention;

FIGS. 2, 3 and 4 are diagrammatic views showing the method of forming the assembly;

FIGS. 5 and 6 are perspective views showing the crimped end of a nail formed in accordance with the invention; and FIG. 7 is a cross sectional view of a bracket secured to supporting structure.

As indicated above, the invention will be described with reference to a particular type of window shade bracket. The bracket of FIG. 1 is called an "inside" style bracket. It should be understood that the invention is applicable to "outside" style brackets as well as other types of brackets.

The bracket of FIG. 1 comprises a cup-shaped portion 10 having a central hole 11 and slot 12 which receives the tang of a window shade roller and prevents the tang from rotating with respect to the bracket. The slot 12 is flared as at 13 to facilitate the introduction of the tang into the hole and slot 11 and 12.

The bracket has foot portions 14 and 15. The structure thus far described is, of course, very well known in the art and per se forms no part of the present invention except as it is in combination with inventive structure as described below.

Each foot portion 14 and 15 is apertured as at 16 to receive a nail 17 in slidable engagement in the hole. Each nail has a head 18 at one end thereof and a point 19 at the other end thereof. While a common nail is shown, it will be appreciated that other similar fasteners, shaped in accordance with the invention, as discussed below, may be employed.

As shown in FIGS. 5 and 6, the end portion of each nail is crimped to form laterally extending ears 20. The ears project beyond the walls of the holes 16 so as to prevent removal of the nails by sliding out through the holes.

The method by which the unit is manufactured is illustrated in FIGS. 2, 3 and 4. After a bracket 9 has been formed without the nail receiving holes, the bracket is mounted on a die block 21. The hole 16 is formed by driving a blunt ended punch 22 through the sheet metal from which the bracket 9 is formed. The process of punching the hole 16 results in the striking of an annular flange 23 having a generally cylindrical inside wall 24. It should be understood that the flange 23 will not necessarily have a perfectly smooth edge, but rather will probably be non-uniformly serrated as the metal plastically deforms during the punching operation.

After the hole 16 and annular flange 23 have been formed, the nail 17 is passed through the hole and the end of the nail adjacent the point is crimped by any suitable crimping tool indicated diagrammatically at 25. The crimping forms the ears 20 which project beyond the inside diameter of the walls 24 of the annular flange 23. Thus, the ears 20 prevent the withdrawal of the nail from the bracket. The relative size of the ears with respect to the diameter of the hole 16 and walls 24 by which the withdrawal of the nail is prevented is illustrated in FIG. 4.

In operation of the unit, a window shade bracket, for example, is held in the proper position on a frame 26 (FIG. 7) of the window with the bracket being held closely adjacent the frame surface. Initially, the bracket will be spaced from the frame by the small length of nail which projects through the bracket, as illustrated in FIG. 4.

Both nails may be struck (independently) to drive at least that short projecting portion into the frame so that the bracket can be held against the frame. Thereafter the nails are driven completely into the wood, the last strokes serving to drive the annular flange 23 into the wood so that the resulting structure is as illustrated in FIG. 7.

The supporting frame is indicated at 26 and is pierced as at 27 by the annular flange 23. It will be appreciated that the driving of the annular flange 23 into the wood of the frame 26 prevents lateral displacement of the bracket with respect to the frame independently of the nail. The nail cooperates by preventing the loosening of the bracket in an axial direction and also provides additional lateral support for the bracket.

Having described my invention, I claim:

1. An article of manufacture comprising a window shade bracket having at least one planar foot portion adapted to lie flat against a wood surface and a shade roller receiving portion, said foot portion having a hole therein, a nail having a head at one end and a point at the other end slidably mounted in said hole, an annular flange projecting from said foot portion in the direction of said point end and surrounding said hole, said flange terminating in an edge sharp enough to be driven into said wood surface, said flange slidably supporting said nail in a position substantially perpendicular to the plane of said foot portion, and ears laterally projecting from the point end of said nail to block inadvertent withdrawal of said nail from said hole.

2. An article of manufacture comprising a window shade bracket having two planar foot portions adapted to lie flat against a wood surface and a shade roller receiving portion, each said foot portion having a hole therein, a nail having a head at one end and a point at the other end slidably mounted in each said hole, an annular flange integral with each said foot portion surrounding said hole, said flange terminating in an edge sharp enough to be driven into said wood surface, and slidably supporting said nail in a position substantially perpendicular to the plane of said foot portion, and ears laterally projecting from the point end of said nail to block inadvertent withdrawal of said nail from said hole.

3. An article of manufacture comprising a window shade bracket having at least one foot portion adapted to lie flat against a wood surface and a shade roller receiving portion, said foot portion having a hole therein, a nail slidably mounted in said hole, an annular flange integral with said foot portion surrounding said hole, said flange terminating in an edge sharp enough to be driven into said wood surface, and slidably supporting said nail in a position substantially perpendicular to the plane of said foot portion.

4. An article of manufacture comprising a bracket adapted to be nailed to supporting structure, said bracket having a foot portion, a nail slidably mounted in said foot portion, said nail having a head end and a pointed end, an annular flange projecting from said foot portion in the direction of the pointed end of said nail, and embracing said nail to maintain said nail substantially fixed against lateral movement while permitting said nail to slide with respect to said foot portion, said flange terminating in an edge sharp enough to be driven into said wood surface, and ears projecting laterally from the pointed end of said nail to block inadvertent withdrawal of said nail from said foot portion.

References Cited in the file of this patent

UNITED STATES PATENTS

| | | |
|---|---|---|
| 1,427,953 | Harrison | Sept. 5, 1922 |
| 1,600,374 | Talbot | Sept. 21, 1926 |
| 1,673,430 | Voight | June 12, 1928 |
| 1,912,099 | Rosenberg | May 30, 1933 |
| 2,425,025 | Boisselier | Aug. 5, 1947 |
| 2,729,884 | Mautone | Jan. 10, 1956 |

FOREIGN PATENTS

| | | |
|---|---|---|
| 428,284 | Great Britain | May 9, 1935 |